(12) United States Patent
Wang et al.

(10) Patent No.: US 12,309,751 B2
(45) Date of Patent: May 20, 2025

(54) METHOD FOR CROSS-CARRIER TRANSMISSION AND TERMINAL DEVICE

(71) Applicant: GUANGDONG OPPO MOBILE TELECOMMUNICATIONS CORP., LTD., Guangdong (CN)

(72) Inventors: Shukun Wang, Dongguan (CN); Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 367 days.

(21) Appl. No.: 17/448,400

(22) Filed: Sep. 22, 2021

(65) Prior Publication Data
US 2022/0007398 A1    Jan. 6, 2022

Related U.S. Application Data

(63) Continuation of application No. PCT/CN2019/118857, filed on Nov. 15, 2019.

(51) Int. Cl.
*H04L 1/1829*    (2023.01)
*H04L 1/1867*    (2023.01)
(Continued)

(52) U.S. Cl.
CPC ....... *H04W 72/0446* (2013.01); *H04L 1/1861* (2013.01); *H04L 1/1893* (2013.01);
(Continued)

(58) Field of Classification Search
CPC . H04L 1/12–1896; H04L 5/0001–0098; H04L 27/26–30; H04W 8/22–245;
(Continued)

(56) References Cited

U.S. PATENT DOCUMENTS 9,113,483 B2    8/2015    Zou
9,363,049 B2    6/2016    Li
(Continued)

FOREIGN PATENT DOCUMENTS

CN    102685897 A    9/2012
CN    102752090 A    10/2012
(Continued)

OTHER PUBLICATIONS

Third Office Action of the European application No. 19952813.4, issued on Sep. 8, 2023. 6 pages.
(Continued)

*Primary Examiner* — Timothy J Weidner
(74) *Attorney, Agent, or Firm* — PERKINS COIE LLP

(57) ABSTRACT

A cross-carrier transmission method and a terminal device are provided. The method comprises operations as follows. A terminal device receives a first channel on a first carrier and a first time domain position, and receives or transmits a second channel on a second carrier and a second time domain position. The second time domain position is determined based on at least one of the first time domain position, a first time deviation and a second time deviation, the first time deviation is a time deviation between the first carrier and the second carrier, and the second time deviation is a time deviation between a starting time domain position of the first channel and a starting time domain position of the second channel.

24 Claims, 15 Drawing Sheets

A terminal device receives a first channel on a first carrier and a first time domain position, and receives or transmits a second channel on a second carrier and a second time domain position. The second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel

401

(51) Int. Cl.

| | |
|---|---|
| *H04L 5/00* | (2006.01) |
| *H04W 28/04* | (2009.01) |
| *H04W 28/06* | (2009.01) |
| *H04W 56/00* | (2009.01) |
| *H04W 72/0446* | (2023.01) |
| *H04W 72/0453* | (2023.01) |
| *H04W 72/1268* | (2023.01) |
| *H04W 72/1273* | (2023.01) |
| *H04W 72/23* | (2023.01) |
| *H04W 72/232* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 5/0055* (2013.01); *H04L 5/0092* (2013.01); *H04W 28/04* (2013.01); *H04W 28/06* (2013.01); *H04W 56/001* (2013.01); *H04W 56/003* (2013.01); *H04W 72/0453* (2013.01); *H04W 72/1268* (2013.01); *H04W 72/1273* (2013.01); *H04W 72/23* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 28/02–26; H04W 48/02–20; H04W 56/0005–0095; H04W 72/02–569; H04W 74/002–008; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 9,794,033 | B2 | 10/2017 | Fwu et al. |
| 9,912,504 | B2 | 3/2018 | Krzymien et al. |
| 10,349,442 | B2 | 7/2019 | Baghel et al. |
| 10,462,739 | B2 | 10/2019 | Papasakellariou |
| 2012/0269180 | A1 | 10/2012 | Li |
| 2014/0031054 | A1 | 1/2014 | Zou |
| 2015/0264699 | A1 | 9/2015 | Fwu et al. |
| 2015/0341962 | A1 | 11/2015 | Zou et al. |
| 2016/0037524 | A1 | 2/2016 | Krzymien et al. |
| 2018/0006776 | A1 | 1/2018 | Fwu et al. |
| 2018/0131482 | A1 | 5/2018 | Zhou et al. |
| 2020/0022175 | A1* | 1/2020 | Xiong .................. H04W 72/04 |
| 2020/0120701 | A1 | 4/2020 | Peng et al. |
| 2021/0112563 | A1* | 4/2021 | Hua ...................... H04W 72/04 |
| 2021/0219328 | A1 | 7/2021 | Xiong et al. |
| 2022/0272650 | A1* | 8/2022 | Ko ........................ H04W 72/04 |

FOREIGN PATENT DOCUMENTS

| | | |
|---|---|---|
| CN | 105981466 A | 9/2016 |
| CN | 106537979 A | 3/2017 |
| EP | 3627936 A1 | 3/2020 |
| RU | 2292646 C2 | 1/2007 |
| RU | 2432689 C2 | 10/2011 |
| RU | 2668112 C1 | 9/2018 |
| WO | 2015109594 A1 | 7/2015 |
| WO | 2018175820 A1 | 9/2018 |
| WO | 2018228570 A1 | 12/2018 |

OTHER PUBLICATIONS

3GPP TSG RAN WG1 Meeting #98bis R1-1910684, Chongqing, China, Oct. 14-20, 2019, Agenda Item: 7.2.13.5, Source: Intel Corporation, Title: Discussion on unaligned frame boundary for NR inter-band CA, Document for: Discussion/Decision. the whole document. 3 pages.

3GPP TSG RAN Meeting #85 RP-192304, New Port Beach, US, Sep. 16-20, 2019, Agenda Item: 9.4.10, Source: CMCC. Title: Summary of discussion on relaxation of the frame timing for R16 NR CA, Document for: Discussion. the whole document. 4 pages.

3GPP TSG RAN WG1 #98bis R1-1911607, Chongqing, China, Oct. 14-20, 2019, Agenda item: 7.2.13.5, Source: CMCC, Title: FL Summary on support of unaligned frame boundary for R16 NR inter-band CA, Document for: Discussion/Decision. the whole document. 14 pages.

First Office Action of the Japanese application No. 2021-576402, issued on Aug. 18, 2023. 10 pages with English translation.

Office Action of the Indian application No. 202117042692, issued on Jun. 23, 2022.

English translation of the Written Opinion of the International Search Authority in the international application No. PCT/CN2019/118857, mailed on Jul. 31, 2020.

MediaTek Inc, "On Timing Relationship for Cross-carrier Scheduling with Different Numerologies", 3GPP TSG RAN WG1 Meeting #96 R1-1901808, Athens, Greece, Feb. 25-Mar. 1, 2018. 2 pages.

MediaTek Inc, "Remaining issues of DLUL scheduling and HARQ management", 3GPP TSG RAN WG1 Meeting #93 R1-1806801, Busan, Korea, May 21-25, 2018. 9 pages.

Supplementary European Search Report in the European application No. 19952813.4, mailed on Feb. 18, 2022. 13 pages.

3GPP TS 38.213 V16.3.0 (Sep. 2020), Technical Specification, 3rd Generation Partnership Project; Technical Specification Group Radio Access Network;NR;Physical layer procedures for control(Release 16).

3GPP TS 38.214 V16.3.0 (Sep. 2020), Technical Specification,3rd Generation Partnership Project;Technical Specification Group Radio Access Network;NR;Physical layer procedures for data(Release 16).

3GPP TS 38.331 V16.2.0 (Sep. 2020), Technical Specification,3rd Generation Partnership Project;Technical Specification Group Radio Access Network;NR;Radio Resource Control (RRC) protocol specification(Release 16).

International Search Report in the international application No. PCT/CN2019/118857, mailed on Jul. 31, 2020.

First Office Action of the Russian application No. 2022100730, issued on Dec. 13, 2022. 14 pages with English translation.

Huawei, HiSilicon, "On NR carrier aggregation", 3GPP TSG RAN WG1 NR Ad-Hoc Meeting R1-1709975, Qingdao, China, Jun. 27-30, 2017. 6 pages.

Huawei, HiSilicon, "Discussion on the relaxation of the frame timing for CA", 3GPP TSG RAN WG1 Meeting #98bis R1-1910401, Chongqing, China, Oct. 14-20, 2019. 5 pages.

CMCC, "FL Summary on support of unaligned frame boundary for R16 NR inter-band CA", 3GPP TSG RAN WG1 #98bis R1-1911668, Chongqing, China, Oct. 14-20, 2019. 14 pages.

First Office Action of the European application No. 19952813.4, issued on Nov. 17, 2022. 8 pages.

First Office Action of the Chinese application No. 202110872226.0, issued on Nov. 30, 2022. 13 pages with English translation.

3GPP TS 38.133 V16.1.0, 3rd Generation Partnership Project;Technical Specification Group Radio Access Network; NR;Requirements for support of radio resource management (Release 16), Technical Specification, (Sep. 2019). 1031 pages.

Supplementary European Search Report in the European application No. 24181615.6, mailed on Oct. 16, 2024. 13 pages.

* cited by examiner

A terminal device receives a first channel on a first carrier and a first time domain position, and receives or transmits a second channel on a second carrier and a second time domain position. The second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel — 401

FIG. 4 ized as an Evolutionary Node B (eNB or eNodeB) in an LTE system or a wireless controller in a Cloud Radio Access Network (CRAN), or the network device may also be a mobile switching center, a relay station, an access point, an
METHOD FOR CROSS-CARRIER TRANSMISSION AND TERMINAL DEVICE

CROSS-REFERENCE TO RELATED APPLICATIONS

This is a continuation application of International Patent Application No. PCT/CN2019/118857, filed on Nov. 15, 2019, the disclosure of which is hereby incorporated by reference in its entirety.

BACKGROUND

In order to meet the high-rate requirement, the carrier aggregation (CA) technology is supported in the 5th Generation (5G) system. By jointly scheduling and using resources on multiple Component Carriers (CCs) in the CA, a larger bandwidth is supported in the CA, thereby reaching a higher system peak rate. The CA may be applied in a cross-carrier scheduling scenario. When two carriers in the cross-carrier scheduling are not synchronized, a problem of inaccurate timing may occurs.

SUMMARY

The embodiments of the disclosure relate to the technical field of mobile communication, in particular to a method for cross-carrier transmission, and a terminal device.

A first aspect of the disclosure provides a method for cross-carrier transmission, which includes the following operations.

A terminal device receives a first channel on a first carrier and a first time domain position, and receives or transmits a second channel on a second carrier and a second time domain position.

The second time domain position is determined based on at least one of the first time domain position, a first time deviation or a second time deviation. The first time deviation is a time deviation between the first carrier and the second carrier, and the second time deviation is a time deviation between a starting time domain position of the first channel and a starting time domain position of the second channel.

A second aspect of the disclosure provides a terminal device, which includes a processor, a memory and a transceiver. The memory is configured to store a computer program, and the processor is configured to call and execute the computer program stored in the memory to perform the following operations.

The transceiver is controlled to receive a first channel on a first carrier and a first time domain position, and receive or transmit a second channel on a second carrier and a second time domain position.

The second time domain position is determined based on at least one of the first time domain position, a first time deviation or a second time deviation. The first time deviation is a time deviation between the first carrier and the second carrier, and the second time deviation is a time deviation between a starting time domain position of the first channel and a starting time domain position of the second channel.

BRIEF DESCRIPTION OF THE DRAWINGS

The drawings illustrated herein, which are used to provide further understanding of the disclosure, constitute a part of the disclosure, and the exemplary embodiments of the disclosure and the descriptions thereof are used to explain the disclosure, and are not intended to unduly limit the disclosure. In the drawings:

FIG. 4 is a schematic flow diagram of a method for cross-carrier transmission according to an embodiment of the disclosure;

DETAILED DESCRIPTION

The technical solutions in the embodiments of the disclosure will be described below in combination with the drawings in the embodiments of the disclosure. It is apparent that the described embodiments are a part rather than all of the embodiments of the disclosure. Based on the embodiments of the disclosure, all other embodiments obtained by those of ordinary skill in the art without paying any creative work shall fall within the scope of protection of the disclosure.

The technical solutions in the embodiments of the disclosure may be applied to various communication systems, such as a Long Term Evolution (LTE) system, an LTE Frequency Division Duplex (FDD) system, an LTE Time Division Duplex (TDD) system, a 5G communication system, or a future communication system etc.

Figure 1:
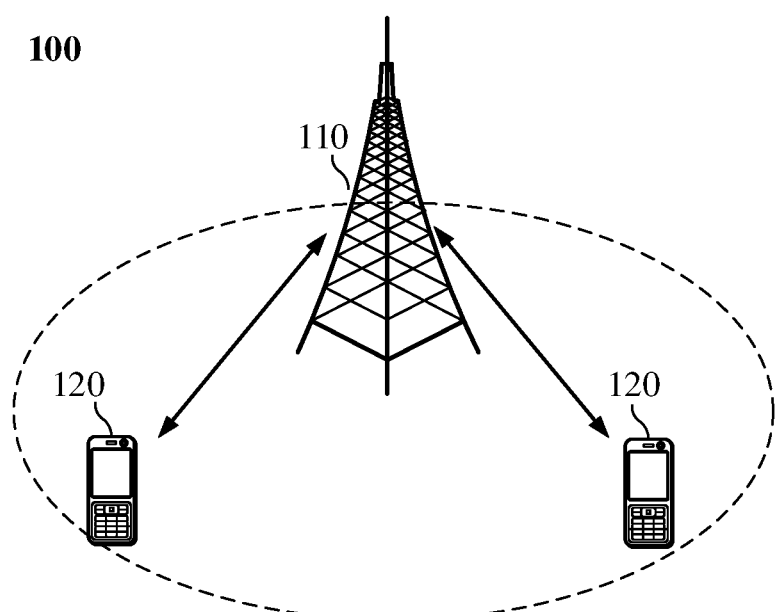
FIG. 1 is a schematic diagram of architecture of a communication system according to an embodiment of the disclosure.

Exemplarily, a communication system 100 that the embodiments of the disclosure are applied to is shown in FIG. 1. The communication system 100 may include a network device 110, and the network device 110 may be a device that communicates with a terminal 120 (or called a communication terminal or a terminal). The network device 110 may provide communication coverage for a particular geographic region and may communicate with a terminal located in the coverage. Optionally, the network device 110 may be an Evolutional Node B (eNB or eNodeB) in an LTE system or a wireless controller in a Cloud Radio Access Network (CRAN), or the network device may also be a mobile switching center, a relay station, an access point, an in-vehicle device, a wearable device, a hub, a switch, a network bridge, a router, a network-side device in a 5G network, a network device in a future communication system.

The communication system 100 further includes at least one terminal 120 within the coverage of the network device 110. A "terminal" used herein includes, but is not limited to be connected through a wired line connection, for example, through a Public Switched Telephone Network (PSTN), a Digital Subscriber Line (DSL), a digital cable and a direct cable connection, and/or another data connection/network and/or through a wireless interface, for example, through a cellular network, a Wireless Local Area Network (WLAN), a digital television networks like a Digital Video Broadcasting-Handheld (DVB-H) network, a satellite network or an Amplitude Modulated (AM)-Frequency Modulated (FM) broadcast transmitter, and/or via a device, configured to receive/send a communication signal, of another terminal, and/or Internet of Things (IoT) device. The terminal configured to communicate through a wireless interface may be called a "wireless communication terminal", a "wireless terminal" or a "mobile terminal". Examples of mobile terminals include, but are not limited to: a satellite or cellular telephone; a Personal Communications System (PCS) terminal capable of combining a cellular radio telephone and data processing, faxing and data communication capabilities, a Personal Digital Assistant (PDA) capable of including a radio telephone, a pager, Internet/Intranet access, a Web browser, a notebook, a calendar and/or a Global Positioning System (GPS) receiver; and a conventional laptop and/or palmtop receiver or other electronic devices including a radio telephone transceiver. The terminal may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cellphone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an in-vehicle device, a wearable device, a terminal in the 5G network, a terminal in the future evolved Public Land Mobile Network (PLMN) etc.

Optionally, Device to Device (D2D) communication may be performed between terminals 120.

Optionally, the 5G communication system or the 5G network may also be called a New Radio (NR) system or an NR network.

A network device and two terminals are exemplarily shown in FIG. 1. Optionally, the communication system 100 may include multiple network devices and the other number of terminals may be included in the coverage of each network device, which is not limited in the embodiments of the disclosure.

Optionally, the communication system 100 may further include other network entities such as a network controller, a mobility management entity, which is not limited in the embodiments of the disclosure.

It is to be understood that a device having a communication function in a network/system in the embodiments of the disclosure may be called a communication device. Taking the communication system 100 shown in FIG. 1 as an example, the communication device may include the network device 110 and the terminal 120 having the communication function, and the network device 110 and the terminal 120 may be specific devices mentioned above and will not be elaborated herein. The communication device may further include other devices in the communication system 100, for example, other network entities like a network controller and a mobility management entity, which is not limited in the embodiments of the disclosure.

It is to be understood that the terms "system" and "network" in the disclosure may usually be used interchangeably. In the disclosure, term "and/or" refers to only an association relationship for describing associated objects and represents that three relationships may exist. For example, A and/or B may represent three conditions: i.e., only A, both A and B, and only B. In addition, character "I" in the disclosure usually represents that previous and next associated objects form an "or" relationship.

In order to facilitate understanding the technical solutions in the embodiments of the disclosure, the technical solutions related to the embodiments of the disclosure are described below.

With people's pursuit of rate, latency, high-speed mobility, energy efficiency, and the diversity and complexity of services in future life, 5G is developed by the 3rd Generation Partnership Project (3GPP) International Standards Organization. The main application scenarios of 5G are enhanced Mobile Broadband (eMBB), Ultra-Reliable Low-Latency Communications (URLLC), and massive Machine-Type Communications (mMTC).

On one hand, the eMBB is used by a user to access to multimedia contents, services and data, and the requirements thereof grow very rapidly. On the other hand, since the eMBB may be deployed in different scenarios, such as indoor, urban, rural etc., which results in large difference in capabilities and requirements. Therefore, the eMBB should be analyzed in detail in combination with a specific deployment scenario rather than being described unconditionally. Typical applications of the URLLC include industrial automation, power automation, telemedicine operation (surgery), traffic safety guarantee, etc. Typical features of the mMTC include high connection density, small amount of data, latency-insensitive services, low cost and long service life of modules, etc.

At the early deployment of NR, it is difficult to obtain a complete NR coverage. Therefore, typical network coverage includes wide-area LTE coverage and an island NR coverage mode. Furthermore, a large number of LTEs are deployed at a frequency spectrum below 6 GHz, and little frequency spectrums below 6 GHz may be reserved for 5G. Therefore, the NR must study applications in the frequency spectrum above 6 GHz, but the coverage is limited and signal attenuation is fast at the high frequency band. Meanwhile, in order to protect the mobile operator's previous investment in the LTE, an operation mode that tight interworking is performed between the LTE and the NR is proposed.

Figure 2A:
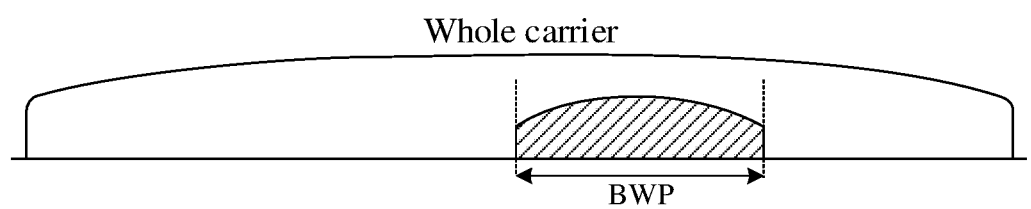
FIG. 2A is a first schematic diagram of a BandWidth Part (BWP) according to an embodiment of the disclosure.
Figure 2B:
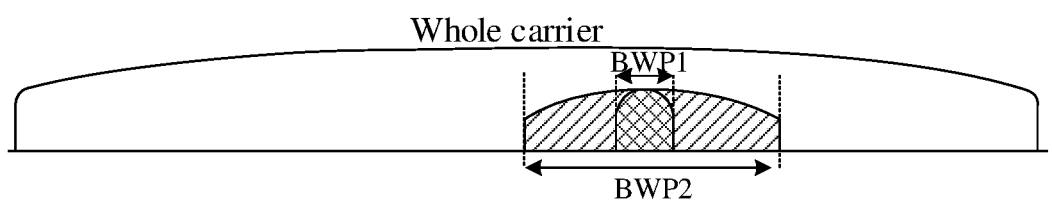
FIG. 2B is a second schematic diagrams of a BWP according to an embodiment of the disclosure.
Figure 2C:
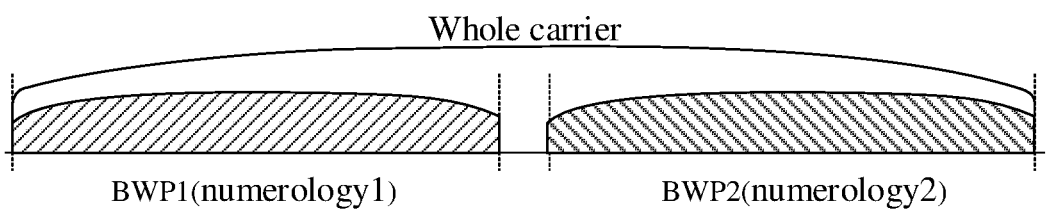
FIG. 2C is a third schematic diagram of a BWP according to an embodiment of the disclosure.

In 5G, the maximum channel bandwidth may be 400 MHZ (referred to as a wideband carrier), and the bandwidth of the wideband carrier is large compared to the maximum bandwidth 20M of the LTE. When the terminal device always operating on the wideband carrier, the power consumption of the terminal device is very large. Therefore, it is suggested that the Radio Frequency (RF) bandwidth of the terminal device may be adjusted according to the actual throughput of the terminal device. To this end, the concept of BandWidth Part (BWP) is introduced, and the motivation of the BWP is to optimize the power consumption of the terminal device. For example, when a rate of the terminal device is low, a small BWP may be configured for the terminal device (as shown in FIG. 2A). When the rate of the terminal device is required to be high, a large BWP may be configured for the terminal device (as shown in FIG. 2B). When the terminal device supports a high rate, or operates in a Carrier Aggregation (CA) mode, multiple BWPs may be configured for the terminal device (as shown in FIG. 2C). Another objective of the BWP is to trigger the coexistence of multiple numerologies in a cell. As shown in FIG. 2C, BWP1 corresponds to numerology1 and BWP2 corresponds to numerology2.

A terminal device may be configured with at most four uplink BWPs and at most four downlink BWPs via Radio Resource Control (RRC) dedicated signaling, but only one uplink BWP and one downlink BWP may be activated at the same time. The first activated BWP (i.e., an initially activated BWP) in the configured BWPs may be indicated in the RRC dedicated signaling. Meanwhile, when the terminal device is in the connected state, the terminal device may also switch between different BWPs through Downlink Control Information (DCI). When a carrier in an inactive state enters an active state, a first activated BWP is the first activated BWP configured in the RRC dedicated signaling.

In order to meet the high rate requirement, the Carrier Aggregation (CA) technology is also supported in the 5G. By jointly scheduling and using resources on multiple Component Carriers (CCs), the NR system can support a large bandwidth by using the CA, thereby acquiring a high system peak rate. According to spectral continuity of the aggregated carrier, the carrier aggregation may be divided into continuous carrier aggregation and non-continuous carrier aggregation. According to whether the bands of the aggregated carriers are the same, the carrier aggregation may be divided into Intra-band carrier aggregation and inter-band carrier aggregation.

In the CA, there is only one Primary Cell Carrier (PCC), which provides RRC signaling connection, Non-Access Stratrum (NAS) function, security, etc. A Physical Uplink Control Channel (PUCCH) is present on the PCC and only on the PCC. In the CA, there may be one or more Secondary Cell Components (SCCs), which provide only additional radio resources. The PCC and the SCC are referred to as serving cells. A cell on the PCC is a primary cell (Pcell) and a cell on the SCC is a secondary cell (Scell). It is also specified in the standard that at most five aggregated carriers are supported, i.e. the maximum bandwidth after aggregation is 100 MHZ, and the aggregated carriers belong to the same base station. All the aggregated carriers use the same Cell-Radio Network Temporary Identifier (C-RNTI), and the base station ensures that the C-RNTI does not collide in the cells in which the carriers are located. Since both asymmetric carrier aggregation and symmetric carrier aggregation are supported, the aggregated carriers must have a downlink carrier and may not have an uplink carrier. Furthermore, a PCC cell must include a Physical Downlink Control Channel (PDCCH) and a PUCCH of the cell, and only the PCC cell has the PUCCH, and other SCC may have the PDCCH.

Figure 3A:
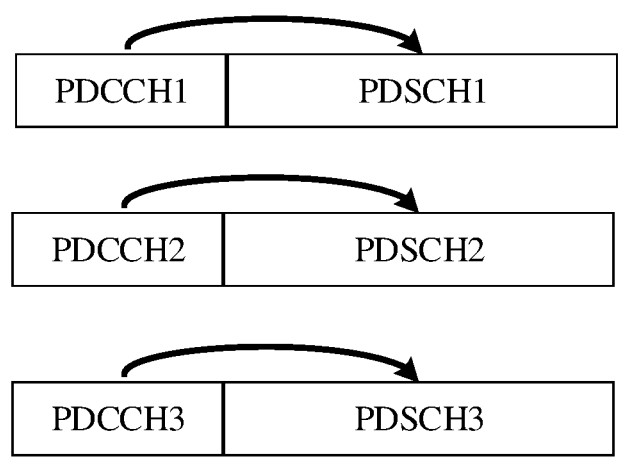
FIG. 3A is a schematic diagram of co-carrier scheduling according to an embodiment of the disclosure.
Figure 3B:
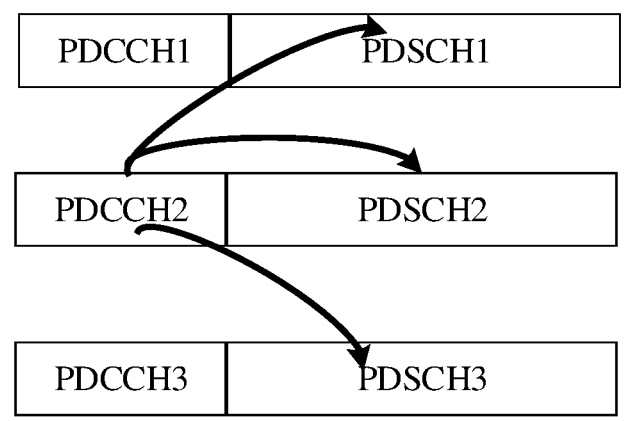
FIG. 3B is a schematic diagram of cross-carrier scheduling according to an embodiment of the disclosure.

In the carrier aggregation, the scheduling for the carriers is divided into co-carrier scheduling and cross-carrier scheduling according to the carriers in which the PDCCH resources used by the scheduling are located. Referring to FIG. 3A, the co-carrier scheduling means that scheduling information of a carrier is scheduled in the PDCCH of the carrier. Referring to FIG. 3B, the cross-carrier scheduling means that the scheduling information of a carrier is scheduled on another carrier. The introduction of the cross-carrier scheduling is based on interference avoidance of heterogeneous networks.

In the cross-carrier scheduling, scheduling information between different carriers is distinguished by a Carrier Indicator Field (CIF) field in DCI, and the CIF indicates the number of the carrier, has a fixed length of 3 bits and a value from 0 to 7. The CIF of the PCC is fixed to 0. The PDCCHs may exist at multiple carriers, and the PCC must have its own PDCCH. The carrier, the PDCCH of which is used by the current SCC for scheduling is configured by the high level.

Figure 3C:
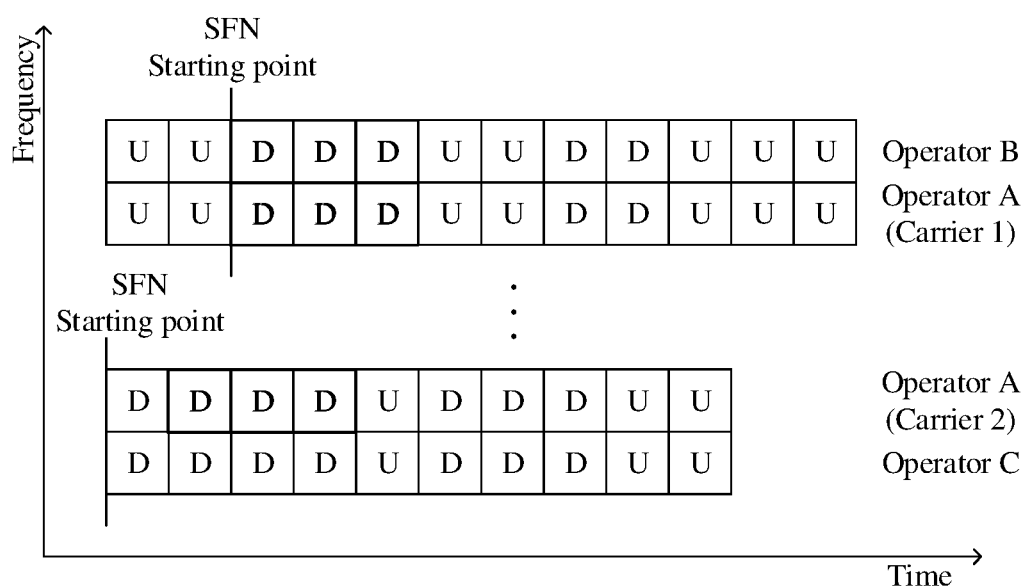
FIG. 3C is a diagram of a timing relationship between carriers according to an embodiment of the disclosure.

At present, carriers for the carrier aggregation are synchronized with each other and are synchronized in terms of a System Frame Number (SFN). However, in some scenarios, the operators may aggregate two carriers that are not synchronized. For example, in a TDD scenario, carriers between operator A and operator B is required to be synchronized so that adjacent frequencies of the two operators do not interfere with each other, by referring to carrier synchronization between carrier 1 of operator A and a carrier of operator B in FIG. 3C, Carriers between operator A and operator C is required to be synchronized so that adjacent frequencies of the two operators do not interfere with each other, by referring to carrier synchronization between carrier 2 of operator A and a carrier of operator C in FIG. 3C. Therefore, two carriers (that is, carrier 1 and carrier 2) of operator A cannot be synchronized, which results in that the carrier aggregation cannot be performed.

Since there is a cross-carrier scheduling scenario in the CA, for example, the terminal device receives the PDCCH on slot 1 on carrier 1, and receives a Physical Downlink Shared Channel (PDSCH) on slot n+K0 on carrier 2. However, since carrier 1 and carrier 2 are not synchronized, a problem of inaccurate timing occurs. This problem also exists in the downlink scheduling scenario, uplink scheduling and downlink feedback scenario. To this end, the following technical solutions according to the embodiments of the disclosure are proposed. When the technical solutions according to the embodiments of the disclosure perform cross-carrier scheduling between carriers that are not synchronized, the terminal device may find a correct timing relationship to transmit/receive data and perform data feedback.

FIG. 4 is a schematic flow diagram of a method for cross-carrier transmission according to an embodiment of the disclosure. As shown in FIG. 4, the method for cross-carrier transmission includes the following operations.

In operation 401, a terminal device receives a first channel on a first carrier and a first time domain position, and receives or transmits a second channel on a second carrier and a second time domain position. The second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel.

The technical solution according to the embodiment of the disclosure may be applied to a scenario of CA in which the first carrier and the second carrier in the CA are not synchronized, that is, there is a time deviation between the first carrier and the second carrier, and the time deviation is referred to as the first time deviation.

In an alternative implementation of the disclosure, the first channel is configured to schedule the second channel. Accordingly, the first carrier may be referred to as a scheduling carrier and the second carrier may be referred to as a scheduled carrier.

In another alternative implementation of the disclosure, the second channel may be a feedback channel of the first channel, that is, the second channel is configured to carry feedback information of the first channel. Accordingly, the first carrier may be referred to as a scheduled carrier and the second carrier may be referred to as a feedback carrier.

In the embodiment of the disclosure, the operation of receiving, by the terminal device, the first channel on the first carrier and the first time domain position, and receiving or transmitting, by the terminal device, the second channel on the second carrier and the second time domain position may be applied into the following scenarios.

First Scenario

The terminal device receives a PDCCH on the first carrier and the first time domain position, and receives a PDSCH on the second carrier and the second time domain position. The PDCCH is configured to schedule the PDSCH.

Second Scenario

The terminal device receives a PDCCH on the first carrier and the first time domain position, and transmits a Physical Uplink Shared Channel (PUSCH) on the second carrier and the second time domain position. The PDCCH is configured to schedule the PUSCH.

Third Scenario

The terminal device receives a PDSCH on the first carrier and the first time domain position, and transmits a PUCCH on the second carrier and the second time domain position. The PUCCH is configured to carry feedback information of the PDSCH.

In the embodiment of the disclosure, since the first carrier and the second carrier are not synchronized, it is necessary to clarify a timing relationship between the first time domain position and the second slot position, which is described in detail below.

1) Determination of the Second Slot Deviation

The second time deviation is a time deviation between a starting time domain position of the first channel and a starting time domain position of the second channel.

In an alternative implementation, the terminal device receives a PDCCH transmitted by a network device, the PDCCH carries first indication information, the first indication information indicates that the second time deviation includes K second time units, and K is a positive integer. The length of the second time unit is the length of a time unit corresponding to a Subcarrier spacing (SCS) of the second carrier.

It should be noted that the length of the time unit corresponding to the SCS of the second carrier is the same as the length of a time unit corresponding to a SCS of the first carrier; or the length of the time unit corresponding to the SCS of the second carrier is different from the length of the time unit corresponding to the SCS of the first carrier.

2) Determination of the First Slot Deviation

The first time deviation is a time deviation between the first carrier and the second carrier.

It should be noted that the first time deviation needs to have the same measurement unit (i.e., a time unit) as the above second time deviation, so that an addition/subtraction operation may be performed. The length of the first time deviation is the length of Y second time units, and Y is a positive integer. The length of the second time unit is the length of the time unit corresponding to the SCS of the second carrier.

In the embodiment of the disclosure, the first time deviation configured by the network side for the terminal device may not be configured taking the second time unit as the measurement unit. Therefore, the value of Y needs to be obtained according to configuration conversion of the network side.

a) In an alternative implementation, the terminal device receives second indication information transmitted by a network device, and the second indication information indicates that the first time deviation includes X1 first time units, and X1 is a positive integer. The length of the first time unit is the length of a time unit corresponding to a SCS of the first carrier. The value of Y is determined based on the value of X1, the length of the first time unit and the length of the second time unit.

For example, Y=X1*the length of the first time unit/the length of the second time unit.

b) In another alternative implementation, the terminal device receives second indication information transmitted by a network device, and the second indication information indicates that the first time deviation includes Y second time units.

c) In yet another alternative implementation, the terminal device receives second indication information transmitted by a network device, and the second indication information indicates that the first time deviation includes X2 third time units, and X2 is a positive integer. The length of the third time unit is the length of a time unit corresponding to a reference SCS, and the value of Y is determined based on the value of X2, the length of the third time unit and the length of the second time unit.

For example, Y=X2*the length of the third time unit/the length of the second time unit.

Further, the reference SCS is configured by the network, or agreed in the protocol.

It should be noted that the time unit (such as the first time unit and the second time unit) in the above solution according to the embodiment of the disclosure is a slot or a symbol.

3) Determination of the Second Time Domain Position

I) In an alternative implementation, the terminal device determines a third time domain position according to the first time domain position and the first time deviation. The first time domain position is aligned with the third time domain position. The terminal device determines the second time domain position according to the third time domain position and the second time deviation.

Specifically, the third time domain position is obtained based on the first time domain position plus the first time deviation; or the third time domain position is obtained based on the first time domain position minus the first time deviation.

Specifically, the second time domain position is obtained based on the third time domain position plus the second time deviation.

The first time domain position is determined with reference to timing of the first carrier, that is, the first time domain position is synchronized with the timing on the first carrier.

II) In another alternative implementation, the terminal device determines the second time domain position according to the first time domain position, the first time deviation and the second time deviation.

Specifically, the second time domain position is obtained based on the first time domain position plus the second time deviation plus the first time deviation; or the second time domain position is obtained based on the first time domain position plus the second time deviation minus the first time deviation.

The first time domain position is determined with reference to timing of the first carrier, that is, the first time domain position is synchronized with the timing on the first carrier.

III) In yet another alternative implementation, the terminal device determines the second time domain position according to the first time domain position and the second time deviation. The second time deviation is determined at least based on the first time deviation.

The second time domain position is obtained based on the first time domain position plus the second time deviation.

The first time domain position is determined with reference to timing of the first carrier, that is, the first time domain position is synchronized with the timing on the first carrier.

IV) The terminal device determines the second time domain position according to the first time domain position and the second time deviation. The first time domain position is determined with reference to timing of the second carrier, that is, the first time domain position is synchronized with the timing on the second carrier.

The second time domain position is obtained based on the first time domain position plus the second time deviation.

It should be noted that the second time domain position determined by the above solution is determined with reference to timing of the second carrier, that is, the second time domain position is synchronized with the timing on the second carrier.

It should be noted that the receiving channel in the embodiment of the disclosure refers to receiving information through a channel, and the transmitting channel refers to transmitting information through a channel. For example, the receiving PDCCH refers to receiving DCI through the PDCCH. The receiving PDSCH refers to receiving downlink data through the PDSCH. The transmitting PUSCH refers to transmitting uplink data through the PUSCH. The transmitting PUCCH refers to transmitting uplink control information (e.g., ACK/NACK feedback information) through the PUCCH.

The technical solutions according to the embodiments of the disclosure are exemplified below in combination with specific examples. The following examples are all exemplified by taking a time unit as a slot, but are not limited thereto. The time unit may also be a symbol.

First Example: Downlink Scheduling Scenario

Figure 5:
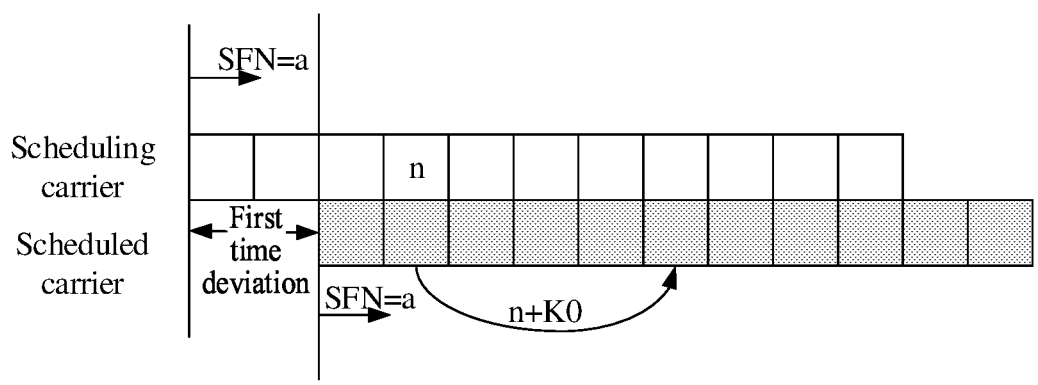
FIG. 5 is a diagram of a timing relationship of a first example according to an embodiment of the disclosure.

The example corresponds to the first scenario of the above technical solution. Referring to FIG. 5, the scheduling carrier is the first carrier, the scheduled carrier is the second carrier, the scheduling carrier and the scheduled carrier are not synchronized, and a time deviation between the two carriers is the first time deviation. The first time deviation includes Y slots (the length of the slots refers to the length of a slot corresponding to SCS of the scheduled carrier). The PDCCH is transmitted on the scheduling carrier and the PDSCH is transmitted on the scheduled carrier. A time deviation of a starting slot of the PDSCH relative to a starting slot of the PDCCH is the second time deviation. The second time deviation includes K0 slots (the length of the slot refers to a length of a slot corresponding to the SCS of the scheduled carrier).

In the cross-carrier scheduling, the scheduling carrier and the scheduled carrier have the same SCS, or the scheduling carrier and the scheduled carrier have different SCS.

I) In an alternative implementation, the terminal device receives the PDCCH on the slot n of the scheduling carrier, and the terminal device determines that the slot n of the scheduling carrier corresponds to the slot m of the scheduled carrier according to the first time deviation (the first time deviation includes Y slots) between two carriers; the terminal device starts receiving the PDSCH on the slot m+K0 of the scheduled carrier. Herein the slot m is a slot (n+Y) or a slot (n−Y).

II) In another alternative implementation, the terminal device receives the PDCCH on the slot n of the scheduling carrier, and the terminal device starts receiving the PDSCH on the slot (n+K0+Y) or the slot (n+K0−Y) of the scheduled carrier.

III) In yet another implementation, the network side considers the first time deviation between two carriers when setting K0. The terminal device receives the PDCCH on the slot n of the scheduling carrier, and the terminal device starts receiving the PDSCH on the slot (n+K0) of the scheduled carrier.

IV) In yet another implementation, the terminal device receives the PDCCH on a time domain position (the time domain position corresponds to the slot n of the scheduled carrier) of the scheduling carrier, and the terminal device starts receiving the PDSCH on the slot (n+K0) of the scheduled carrier.

It should be noted that in the above solution, when the measurement unit (i.e., the slot) of the first time deviation indicated by the network side is not a slot corresponding to the SCS of the scheduled carrier, information indicated by the network side should be converted. Specifically, when the first time deviation indicated by the network side includes X first slots, Y=X*the first slot/the second slot, and the second slot is a slot corresponding to the second SCS (i.e., the SCS of the scheduled carrier). The first slot is a slot corresponding to the first SCS (i.e., the SCS of the scheduling carrier or the reference SCS or the SCS of the scheduled carrier).

Second Example: Uplink Scheduling Scenario

Figure 6:
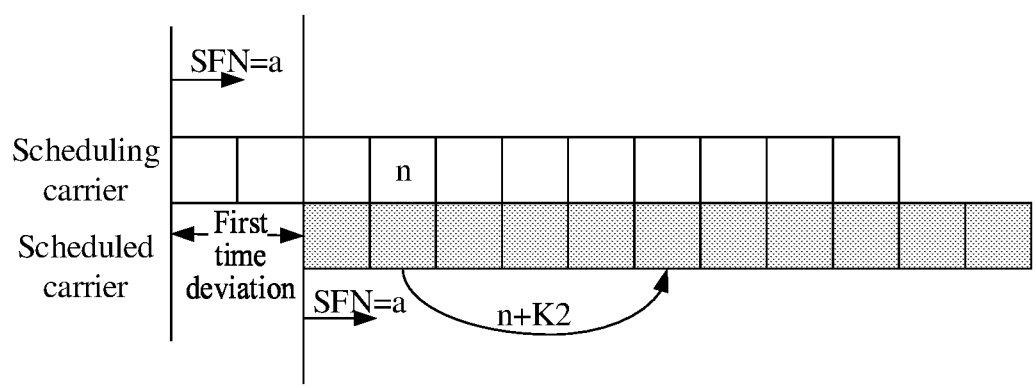
FIG. 6 is a diagram of a timing relationship of a second example according to an embodiment of the disclosure.

The example corresponds to the second scenario of the above technical solution. Referring to FIG. 6, the scheduling carrier is the first carrier, the scheduled carrier is the second carrier, the scheduling carrier and the scheduled carrier are not synchronized, and a time deviation between the two carriers is the first time deviation. The first time deviation includes Y slots (the length of the slots refers to the length of a slot corresponding to the SCS of the scheduled carrier). The PDCCH is transmitted on the scheduling carrier and the PUSCH is transmitted on the scheduled carrier. A time deviation of a starting slot of the PUSCH relative to a starting slot of the PDCCH is the second time deviation. The second time deviation includes K2 slots (the length of the slot refers to the length of a slot corresponding to the SCS of the scheduled carrier).

In the cross-carrier scheduling, the scheduling carrier and the scheduled carrier have the same SCS, or the scheduling carrier and the scheduled carrier have different SCS.

I) In an alternative implementation, the terminal device receives the PDCCH on slot n of the scheduling carrier, and the terminal device determines that slot n of the scheduling carrier corresponds to slot m of the scheduled carrier according to the first time deviation (the first time deviation includes Y slots) between two carriers. The terminal device starts transmitting the PUSCH on slot m+K2 of the scheduled carrier. Herein slot m is slot (n+Y) or slot (n−Y).

II) In another alternative implementation, the terminal device receives the PDCCH on slot n of the scheduling carrier, and the terminal device starts transmitting the PUSCH on slot (n+K2+Y) or slot (n+K2−Y) of the scheduled carrier.

III) In yet another implementation, the network side considers the first time deviation between two carriers when setting K2. The terminal device receives the PDCCH on slot n of the scheduling carrier, and the terminal device starts transmitting the PUSCH on the slot (n+K2) of the scheduled carrier.

IV) In yet another implementation, the terminal device receives the PDCCH on a time domain position (the time domain position corresponds to slot n of the scheduled carrier) of the scheduling carrier, and the terminal device starts transmitting the PUSCH on the slot (n+K2) of the scheduled carrier.

It should be noted that in the above solution, when the measurement unit (i.e., the slot) of the first time deviation indicated by the network side is not a slot corresponding to the SCS of the scheduled carrier, information indicated by the network side should be converted. Specifically, when the first time deviation indicated by the network side includes X first slots, Y=X*the first slot/the second slot. The second slot is a slot corresponding to the second SCS (i.e., the SCS of the scheduled carrier), and the first slot is a slot corresponding to the first SCS (i.e., the SCS of the scheduling carrier or the reference SCS or the SCS of the scheduled carrier).

Third Example: PUCCH Feedback Scenario

Figure 7:
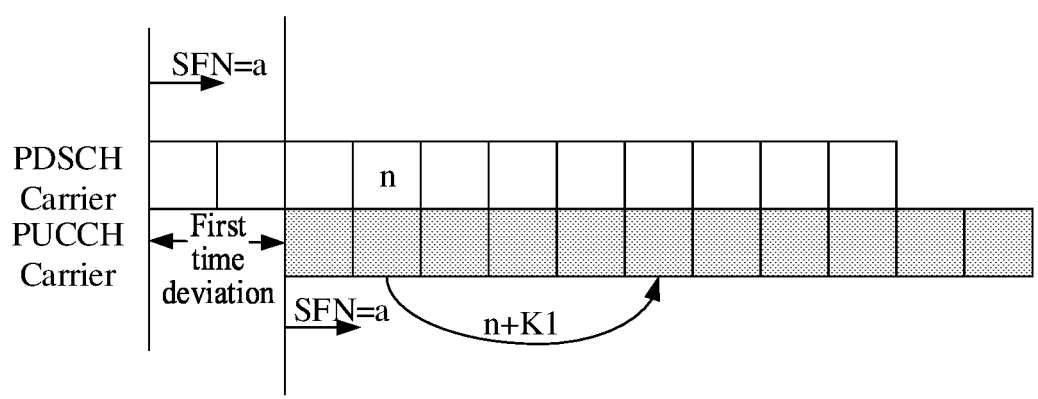
FIG. 7 is a diagram of a timing relationship of a third example according to an embodiment of the disclosure.

The example corresponds to the third scenario of the above technical solution. Referring to FIG. 7, the PDSCH carrier is the first carrier, the PUCCH carrier is the second carrier, the PDSCH carrier and the PUCCH carrier are not synchronized, and a time deviation between the two carriers is the first time deviation. The first time deviation includes Y slots (the length of the slots refers to the length of a slot corresponding to the SCS of the PUCCH carrier). The PDSCH is transmitted on the PDSCH carrier and the PUCCH is transmitted on the PUCCH carrier. The PUCCH is configured to carry feedback information (e.g., ACK/NACK information) of the PDSCH. A time deviation of the starting slot of the PUCCH relative to the starting slot of the PDSCH is the second time deviation. The second time deviation includes K1 slots (the length of the slots refers to the length of a slot corresponding to the SCS of the PUCCH carrier).

The PDSCH carrier and the PUCCH carrier have the same SCS, or the PDSCH carrier and the PUCCH carrier have different SCS.

I) In an alternative implementation, the terminal device receives the PDSCH on slot n of the PDSCH carrier, and the terminal device determines that slot n of the PDSCH carrier corresponds to slot m of the PUCCH carrier according to the first time deviation (the first time deviation includes Y slots) between two carriers. The terminal device starts transmitting the PUCCH on slot m+K1 of the PUCCH carrier. Herein the slot m is a slot (n+Y) or a slot (n−Y).

II) In another alternative implementation, the terminal device receives the PDSCH on slot n of the PDSCH carrier, and the terminal device starts transmitting the PUCCH on slot (n+K1+Y) or slot (n+K1−Y) of the PUCCH carrier.

III) In yet another implementation, the network side considers the first time deviation between two carriers when setting K1. The terminal device receives the PDSCH on slot n of the PDSCH carrier, and the terminal device starts transmitting the PUCCH on the slot (n+K1) of the PUCCH carrier.

IV) In yet another implementation, the terminal device receives the PDSCH on a time domain position (the time domain position corresponds to the slot n of the PUCCH carrier) of the PDSCH carrier, and the terminal device starts transmitting the PUCCH on the slot (n+K1) of the PUCCH carrier.

It should be noted that in the above solution, when the measurement unit (i.e., the slot) of the first time deviation indicated by the network side is not a slot corresponding to the SCS of the PUCCH carrier, information indicated by the network side should be converted. Specifically, when the first time deviation indicated by the network side includes X first slots, Y=X*the first slot/the second slot. The second slot is a slot corresponding to the second SCS (i.e., the SCS of the PUCCH carrier), and the first slot is a slot corresponding to the first SCS (i.e., the SCS of the PDSCH carrier or the reference SCS or the SCS of the PUCCH carrier).

According to the above technical solutions, a timing relationship between two carriers that are not synchronized is determined, so as to ensure that the terminal device can acquire prepared timing and the signals are transmitted effectively.

Figure 8:
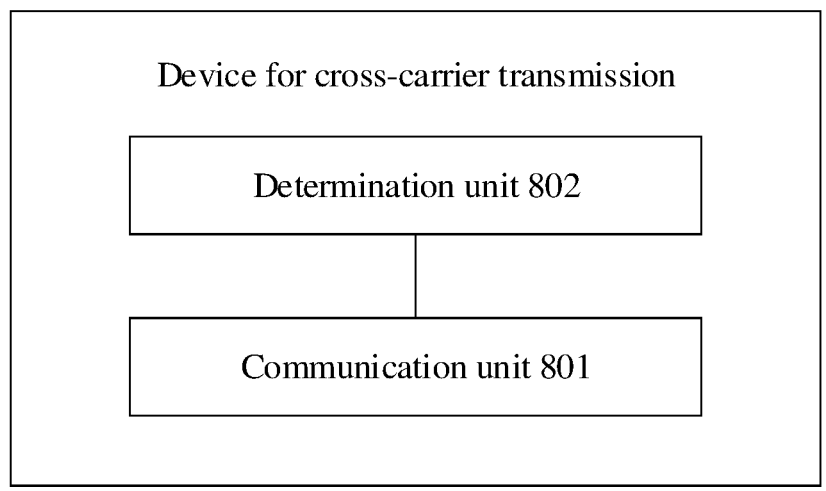
FIG. 8 is a schematic diagram of a structural constitution of a device for cross-carrier transmission according to an embodiment of the disclosure.

FIG. 8 is a schematic structural diagram of components of a device for cross-carrier transmission according to an embodiment of the disclosure. As shown in FIG. 8, the device for cross-carrier transmission includes a communication unit 801.

The communication unit 801 is configured to receive a first channel on a first carrier and a first time domain position, and receive or transmit a second channel on a second carrier and a second time domain position.

The second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel.

In an alternative implementation, the communication unit 801 is further configured to receive a PDCCH transmitted by a network device. The PDCCH carries first indication information, the first indication information indicates that the second time deviation includes K second time units, and K is a positive integer. The length of the second time unit is the length of a time unit corresponding to a SCS of the second carrier.

In an alternative implementation, the length of the time unit corresponding to the SCS of the second carrier is the same as the length of a time unit corresponding to a SCS of the first carrier.

Alternatively, the length of the time unit corresponding to the SCS of the second carrier is different from the length of the time unit corresponding to the SCS of the first carrier.

In an alternative implementation, the length of the first time deviation is the length of Y second time units, and Y is a positive integer. The length of the second time unit is the length of the time unit corresponding to the SCS of the second carrier.

In an alternative implementation, the communication unit 801 is further configured to receive second indication information transmitted by a network device. The second indication information indicates that the first time deviation includes X1 first time units, and X1 is a positive integer. The length of the first time unit is a length of a time unit corresponding to a SCS of the first carrier.

The value of Y is determined based on the value of X1, the length of the first time unit and the length of the second time unit.

In an alternative implementation, the communication unit 801 is further configured to receive second indication information transmitted by a network device. The second indication information indicates that the first time deviation includes Y second time units.

In an alternative implementation, the communication unit 801 is further configured to receive second indication information transmitted by a network device. The second indication information indicates that the first time deviation includes X2 third time units, and X2 is a positive integer. The length of the third time unit is the length of a time unit corresponding to a reference SCS.

The value of Y is determined based on the value of X2, the length of the third time unit and the length of the second time unit.

In an alternative implementation, the reference SCS is configured by the network, or agreed in the protocol.

In an alternative implementation, the time unit is a slot or a symbol.

In an alternative implementation, the device further includes a determination unit 802.

The determination unit 802 is configured to determine a third time domain position according to the first time domain position and the first time deviation. The first time domain position is aligned with the third time domain position, and the second time domain position is determined according to the third time domain position and the second time deviation.

In an alternative implementation, the third time domain position is obtained based on the first time domain position plus the first time deviation.

Alternatively, the third time domain position is obtained based on the first time domain position minus the first time deviation.

In an alternative implementation, the second time domain position is obtained based on the third time domain position plus the second time deviation.

In an alternative implementation, the device further includes a determination unit 802.

The determination unit 802 is configured to determine the second time domain position according to the first time domain position, the first time deviation and the second time deviation.

In an alternative implementation, the second time domain position is obtained based on the first time domain position plus the second time deviation plus the first time deviation.

Alternatively, the second time domain position is obtained based on the first time domain position plus the second time deviation minus the first time deviation.

In an alternative implementation, the device further includes a determination unit 802.

The determination unit 802 is configured to determine the second time domain position according to the first time domain position and the second time deviation.

The second time deviation is determined at least based on the first time deviation.

In an alternative implementation, the second time domain position is obtained based on the first time domain position plus the second time deviation.

In an alternative implementation, the first time domain position is determined with reference to timing of the first carrier.

In an alternative implementation, the device further includes a determination unit 802.

The determination unit 802 is configured to determine the second time domain position according to the first time domain position and the second time deviation.

The first time domain position is determined with reference to timing of the second carrier.

In an alternative implementation, the second time domain position is obtained based on the first time domain position plus the second time deviation.

In an alternative implementation, the communication unit 801 is configured to receive a PDCCH on the first carrier and the first time domain position, and receive a PDSCH on the second carrier and the second time domain position. The PDCCH is configured to schedule the PDSCH.

In an alternative implementation, the communication unit 801 is configured to receive a PDCCH on the first carrier and the first time domain position, and transmit a PUSCH on the second carrier and the second time domain position. The PDCCH is configured to schedule the PUSCH.

In an alternative implementation, the communication unit 801 is configured to receive a PDSCH on the first carrier and the first time domain position, and transmit a PUCCH on the second carrier and the second time domain position. The PUCCH is configured to carry feedback information of the PDSCH.

It should be appreciated by those skilled in the art that the above related descriptions of the device for cross-carrier transmission according to the embodiments of the disclosure may be understood with reference to the related descriptions of the device for cross-carrier transmission according to the embodiments of the disclosure.

Figure 9:
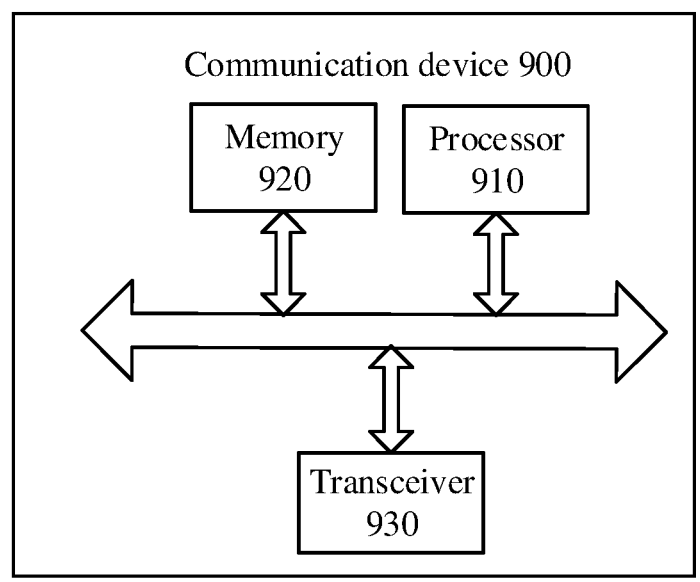
FIG. 9 is a schematic structural diagram of a communication device according to an embodiment of the disclosure.

FIG. 9 is a schematic structural diagram of a communication device 900 according to an embodiment of the disclosure. The communication device may be a terminal device, and may also be a network device. The communication device 900 shown in FIG. 9 includes a processor 910, and the processor 910 may call and run a computer program from a memory to implement the methods in the embodiments of the disclosure.

Optionally, as shown in FIG. 9, the communication device 900 may further include a memory 920, and the processor 910 may call and run a computer program from the memory 920 to implement the methods in the embodiments of the disclosure.

The memory 920 may be a separate device independent of the processor 910, and may be integrated into the processor 910.

Optionally, as shown in FIG. 9, the communication device 900 may further include a transceiver 930, and the processor 910 may control the transceiver 930 to communicate with other devices. Specifically, the processor 910 may control the transceiver 930 to transmit information or data to other devices or to receive information or data transmitted by other devices.

Herein the transceiver 930 may include a transmitter and a receiver. The transceiver 930 may further include an antenna, and the number of the antenna may be one or more.

Optionally, the communication device 900 may specifically be the network device in the embodiments of the disclosure, and the communication device 900 may be configured to implement corresponding flows implemented by the network device in each method in the embodiments of the disclosure. For simplicity, elaborations are omitted herein.

Optionally, the communication device 900 may specifically be the mobile terminal/terminal device in the embodiments of the disclosure, and the communication device 900 may be configured to implement corresponding flows implemented by the mobile terminal/terminal device in each method in the embodiments of the disclosure. For simplicity, elaborations are omitted herein.

Figure 10:
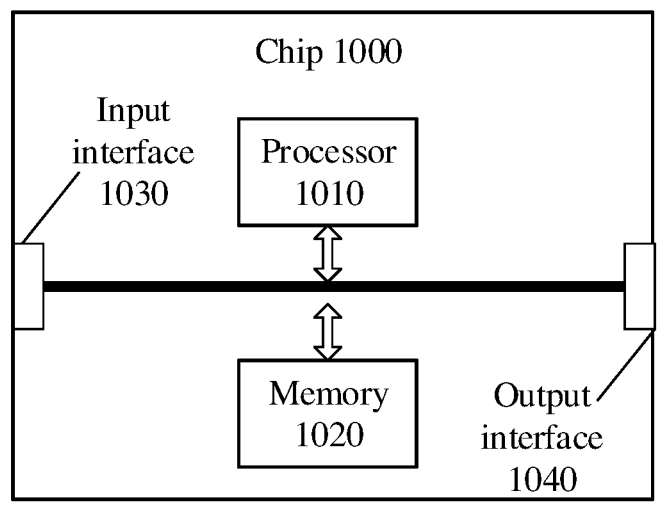
FIG. 10 is a schematic structural diagram of a chip according to an embodiment of the disclosure.

FIG. 10 is a schematic structural diagram of a chip according to an embodiment of the disclosure. The chip 1000 shown in FIG. 10 includes a processor 1010, and the processor 1010 may call and run a computer program from a memory to implement the methods in the embodiments of the disclosure.

Optionally, as shown in FIG. 10, the chip 1000 may further include the memory 1020. Herein the processor 1010 may call and run the computer program from the memory 1020 to implement the methods in the embodiments of the disclosure.

Herein the memory 1020 may be a separate device independent of the processor 1010 and may also be integrated into the processor 1010.

Optionally, the chip 1000 may further include an input interface 1030. Herein the processor 1010 may control the input interface 1030 to communicate with other devices or chips. Specifically, the processor 1010 may control the input interface to acquire information or data transmitted by other devices or chips.

Optionally, the chip 1000 may further include an output interface 1040. Herein the processor 1010 may control the output interface 1040 to communicate with other devices or chips Specifically, the processor 1010 may control the output interface to output information or data to other devices or chips.

Optionally, the chip may be applied to the network device in the embodiments of the disclosure, and the chip may implement corresponding flows implemented by the network device in each method in the embodiments of the disclosure. For simplicity, elaborations are omitted herein.

Optionally, the chip may be applied to the mobile terminal/terminal device in the embodiments of the disclosure, and the chip may implement corresponding flows implemented by the mobile terminal/terminal device in each method in the embodiments of the disclosure. For simplicity, elaborations are omitted herein.

It should be understood that the chip mentioned in the embodiment of the disclosure may also be called a system-level chip, a system chip, a chip system or a system on chip, etc.

Figure 11:
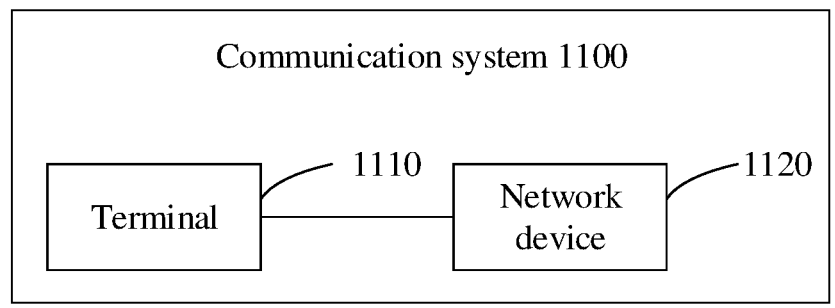
FIG. 11 is a schematic block diagram of a communication system according to an embodiment of the disclosure.

FIG. 11 is a schematic block diagram of a communication system 1100 according to an embodiment of the disclosure. As shown in FIG. 11, the communication system 1100 includes a terminal device 1110 and a network device 1120.

The terminal device 1110 may be configured to implement corresponding functions implemented by the terminal device in the above methods, and the network device 1120 may be configured to implement corresponding functions implemented by the network device in the above methods. For simplicity, elaborations are omitted herein.

It should be understood that the processor in the embodiment of the disclosure may be an integrated circuit chip and has a signal processing capability. In an implementation process, each step in the above method embodiments may be completed by an integrated logical circuit in a hardware form in the processor or an instruction in a software form. The processor may be a general-purpose processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The general-purpose processor may be a microprocessor or the processor may also be any conventional processor and the like. The steps in the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register etc. The storage medium is located in a memory, and the processor reads information in the memory, and completes the steps in the method in combination with the hardware thereof.

It may be understood that the memory in the embodiment of the disclosure may be a volatile memory or a non-volatile memory, or may include both the volatile and non-volatile memories. The non-volatile memory may be a ROM, a PROM, an Erasable PROM (EPROM), an EEPROM or a flash memory. The volatile memory may be an RAM, and is used as an external high-speed cache. In an exemplary but non-limiting embodiment, RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory in the system and method described in the disclosure is intended to include, but be not limited to, memories of these and any other proper types.

It should be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM, etc. That is, the memory in the embodiments of the disclosure is intended to include, but be not limited to, memories of these and any other proper types.

The embodiments of the disclosure also provide a computer-readable storage medium, which is configured to store a computer program.

Optionally, the computer-readable storage medium may be applied to the network device in the embodiments of the disclosure, and the computer program enables a computer to execute corresponding flows implemented by the network device in each method in the embodiments of the disclosure. For simplicity, elaborations are omitted herein.

Optionally, the computer-readable storage medium may be applied to the mobile terminal/terminal device in the embodiments of the disclosure, and the computer program enables a computer to execute corresponding flows implemented by the mobile terminal/terminal device in each method in the embodiments of the disclosure. For simplicity, elaborations are omitted herein.

The embodiments of the disclosure also provide a computer program product, which includes a computer program instruction.

Optionally, the computer program product may be applied to the network device in the embodiments of the disclosure, and the computer program instruction enables a computer to execute corresponding flows implemented by the network device in each method in the embodiments of the disclosure. For simplicity, elaborations are omitted herein.

Optionally, the computer program product may be applied to the mobile terminal/terminal device in the embodiments of the disclosure, and the computer program instruction enables the computer to execute corresponding flows implemented by the mobile terminal/terminal device in each method in the embodiments of the disclosure. For simplicity, elaborations are omitted herein.

The embodiments of the disclosure also provide a computer program.

Optionally, the computer program may be applied to the network device in the embodiments of the disclosure, and the computer program, when being executed on a computer, enables the computer to execute corresponding flows implemented by the network device in each method in the embodiments of the disclosure. For simplicity, elaborations are omitted herein.

Optionally, the computer program may be applied to the mobile terminal/terminal device in the embodiments of the disclosure, and the computer program, when being executed on a computer, enables the computer to execute corresponding flows implemented by the mobile terminal/terminal device in each method in the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may implement the described functions for each specific application with different methods, but such implementation shall not be considered as going beyond the scope of the disclosure.

Those skilled in the art may clearly learn about that regarding specific operation processes of the system, device and unit as described above, reference may made to the corresponding processes in the method embodiment described above, and the specific operation processes are not elaborated herein for convenient and brief description.

In some embodiments provided by the disclosure, it should be understood that the disclosed system, device and method may be implemented in other manners. For example, the device embodiment as described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, device or units, and may be electrical, mechanical or in other forms.

The units described as separate parts may or may not be physically separated, and parts displayed as units may or may not be physical units, and namely may be located in the same place, or may also be distributed to multiple network units. Part or all of the units may be selected to achieve the purpose of the solutions in the embodiments according to a practical requirement.

In addition, functional units in each embodiment of the disclosure may be integrated into a processing unit, each unit may also physically exist independently, or two or more than two units may also be integrated into a unit.

When being realized in form of software functional unit and sold or used as an independent product, the function may be stored in a computer-readable storage medium. Based on such understanding, the essential part of the technical solutions of the embodiments of the present disclosure or a part of the technical solutions that contributes to related technologies or a part of the technical solutions can be implemented in the form of a software product. The computer software product is stored in a storage medium and includes several instructions to enable the computer device (which may be a personal computer, a server or a network device, etc.) to execute all or a part of the methods described in the various embodiments of the present disclosure. The forgoing storage media includes various mediums that can store program codes, such as a USB disk, a mobile hard disk, an ROM, an RAM, a magnetic disk, or an optical disk, and the like.

The foregoing is only the embodiments of the present disclosure, but the protection scope of the present disclosure is not limited thereto. Variation and substitution which can be readily thought by those skilled in the art within the technical scope disclosed in the present disclosure should fall within the protection scope of the present disclosure. Therefore, the protection scope of this disclosure should conform to the protection scope of the claims.

What is claimed is:

1. A method for cross-carrier transmission, comprising:
receiving, by a terminal device, a first channel on a first carrier and a first time domain position, and receiving or transmitting, by the terminal device, a second channel on a second carrier and a second time domain position;
wherein the second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel; and
wherein the method further comprises: receiving, by the terminal device, a Physical Downlink Control Channel (PDCCH) transmitted by a network device, wherein the PDCCH carries first indication information, the first indication information indicates that the second time deviation comprises K second time units, and K is a positive integer, and a length of the second time unit is a length of a time unit corresponding to a Subcarrier Spacing (SCS) of the second carrier;
wherein the method further comprises:
receiving, by the terminal device, second indication information transmitted by the network device, wherein the second indication information indicates that the first time deviation comprises X2 third time units, and X2 is a positive integer, and a length of the third time unit is a length of a time unit corresponding to a reference Subcarrier Spacing (SCS); wherein the reference SCS is configured by a network or agreed in a protocol;
wherein a length of the first time deviation is a length of Y second time units, and Y is a positive integer, and
wherein a value of Y is determined based on a value of X2, the length of the third time unit and the length of the second time unit.

2. The method of claim 1, wherein
the length of the time unit corresponding to the SCS of the second carrier is the same as a length of a time unit corresponding to a SCS of the first carrier; or
the length of the time unit corresponding to the SCS of the second carrier is different from the length of the time unit corresponding to the SCS of the first carrier.

3. The method of claim 1, wherein the time unit is a slot or a symbol.

4. The method of claim 1, further comprising:
determining, by the terminal device, a third time domain position according to the first time domain position and the first time deviation, wherein the first time domain position is aligned with the third time domain position; and
determining, by the terminal device, the second time domain position according to the third time domain position and the second time deviation.

5. The method of claim 4, wherein
the third time domain position is obtained based on the first time domain position plus the first time deviation; or
the third time domain position is obtained based on the first time domain position minus the first time deviation.

6. The method of claim 4, wherein the second time domain position is obtained based on the third time domain position plus the second time deviation.

7. The method of claim 1, further comprising:
determining, by the terminal device, the second time domain position according to the first time domain position, the first time deviation and the second time deviation.

8. The method of claim 7, wherein
the second time domain position is obtained based on the first time domain position plus the second time deviation and plus the first time deviation; or
the second time domain position is obtained based on the first time domain position plus the second time deviation and minus the first time deviation.

9. The method of claim 1, wherein the first time domain position is determined with reference to timing of the first carrier.

10. The method of claim 1, wherein the receiving, by the terminal device, the first channel on the first carrier and the first time domain position, and receiving, by the terminal device, the second channel on the second carrier and the second time domain position, comprises:
receiving, by the terminal device, a Physical Downlink Control Channel (PDCCH) on the first carrier and the first time domain position, and receiving, by the terminal device, a Physical Downlink Shared Channel (PDSCH) on the second carrier and the second time domain position; wherein the PDCCH is configured to schedule the PDSCH.

11. The method of claim 1, wherein the receiving, by the terminal device, the first channel on the first carrier and the first time domain position, and transmitting, by the terminal device, the second channel on the second carrier and the second time domain position comprises:
receiving, by the terminal device, a Physical Downlink Control Channel (PDCCH) on the first carrier and the first time domain position, and transmitting, by the terminal device, a Physical Uplink Shared Channel (PUSCH) on the second carrier and the second time domain position, wherein the PDCCH is configured to schedule the PUSCH.

12. The method of claim 1, wherein the receiving, by the terminal device, the first channel on the first carrier and the first time domain position, and transmitting, by the terminal device, the second channel on the second carrier and the second time domain position comprises:
receiving, by the terminal device, a Physical Downlink Shared Channel (PDSCH) on the first carrier and the first time domain position, and transmitting, by the terminal device, a Physical Uplink Control Channel (PUCCH) on the second carrier and the second time domain position, wherein the PUCCH is configured to carry feedback information of the PDSCH.

13. A terminal device comprising:
a processor;
a memory configured to store a computer program; and
a transceiver,
wherein the processor is configured to call and execute the computer program stored in the memory to perform following operations:
controlling the transceiver to receive a first channel on a first carrier and a first time domain position, and receive or transmit a second channel on a second carrier and a second time domain position;
wherein the second time domain position is determined based on at least one of the first time domain position, a first time deviation or a second time deviation, the first time deviation is a time deviation between the first carrier and the second carrier, and the second time deviation is a time deviation between a starting time domain position of the first channel and a starting time domain position of the second channel; and
wherein the processor is configured to call and execute the computer program stored in the memory to control the transceiver to receive a Physical Downlink Control Channel (PDCCH) transmitted by a network device, wherein the PDCCH carries first indication information, the first indication information indicates that the second time deviation comprises K second time units, and K is a positive integer, and a length of the second time unit is a length of a time unit corresponding to a Subcarrier Spacing (SCS) of the second carrier, and
the processor is configured to call and execute the computer program stored in the memory to control the transceiver to receive second indication information transmitted by the network device, wherein the second indication information indicates that the first time deviation comprises X2 third time units, and X2 is a positive integer, and a length of the third time unit is a length of a time unit corresponding to a reference Subcarrier Spacing (SCS); wherein the reference SCS is configured by a network or agreed in a protocol;
wherein a length of the first time deviation is a length of Y second time units, and Y is a positive integer, and
wherein a value of Y is determined based on a value of X2, the length of the third time unit and the length of the second time unit.

14. The terminal device according to claim 13, wherein
the length of the time unit corresponding to the SCS of the second carrier is the same as a length of a time unit corresponding to a SCS of the first carrier; or
the length of the time unit corresponding to the SCS of the second carrier is different from the length of the time unit corresponding to the SCS of the first carrier.

15. The terminal device of claim 13, wherein the time unit is a slot or a symbol.

16. The terminal device of claim 13, wherein the processor is configured to call and execute the computer program stored in the memory to perform following operations:
  determining a third time domain position according to the first time domain position and the first time deviation, wherein the first time domain position is aligned with the third time domain position; and
  determining the second time domain position according to the third time domain position and the second time deviation.

17. The terminal device of claim 16, wherein
  the third time domain position is obtained based on the first time domain position plus the first time deviation; or
  the third time domain position is obtained based on the first time domain position minus the first time deviation.

18. The terminal device of claim 16, wherein the second time domain position is obtained based on the third time domain position plus the second time deviation.

19. The terminal device of claim 13, wherein the processor is configured to call and execute the computer program stored in the memory to perform following operations:
  determining the second time domain position according to the first time domain position, the first time deviation and the second time deviation.

20. The terminal device of claim 19, wherein
  the second time domain position is obtained based on the first time domain position plus the second time deviation and plus the first time deviation; or
  the second time domain position is obtained based on the first time domain position plus the second time deviation and minus the first time deviation.

21. The terminal device of claim 13, wherein the first time domain position is determined with reference to timing of the first carrier.

22. The terminal device of claim 13, wherein the processor is configured to call and execute the computer program stored in the memory to perform following operations:
  controlling the transceiver to receive a Physical Downlink Control Channel (PDCCH) on the first carrier and the first time domain position, and receive a Physical Downlink Shared Channel (PDSCH) on the second carrier and the second time domain position; wherein the PDCCH is configured to schedule the PDSCH.

23. The terminal device of claim 13, wherein the processor is configured to call and execute the computer program stored in the memory to perform following operations:
  controlling the transceiver to receive a Physical Downlink Control Channel (PDCCH) on the first carrier and the first time domain position, and transmit a Physical Uplink Shared Channel (PUSCH) on the second carrier and the second time domain position, wherein the PDCCH is configured to schedule the PUSCH.

24. The terminal device of claim 13, wherein the processor is configured to call and execute the computer program stored in the memory to perform following operations:
  controlling the transceiver to receive a Physical Downlink Shared Channel (PDSCH) on the first carrier and the first time domain position, and transmit a Physical Uplink Control Channel (PUCCH) on the second carrier and the second time domain position, wherein the PUCCH is configured to carry feedback information of the PDSCH.

\* \* \* \* \*